Oct. 12, 1965
I. D. McEACHERN
3,210,920
ATTACHMENT FOR CYLINDERS OF COMBINES
Filed June 27, 1963
2 Sheets-Sheet 1
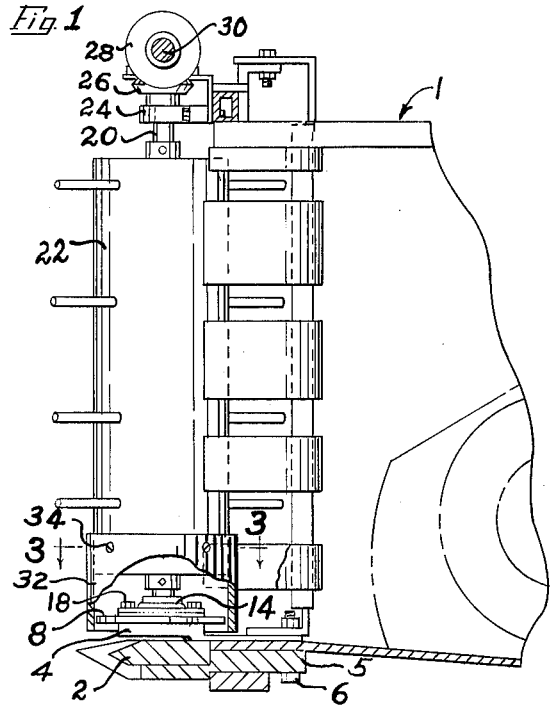
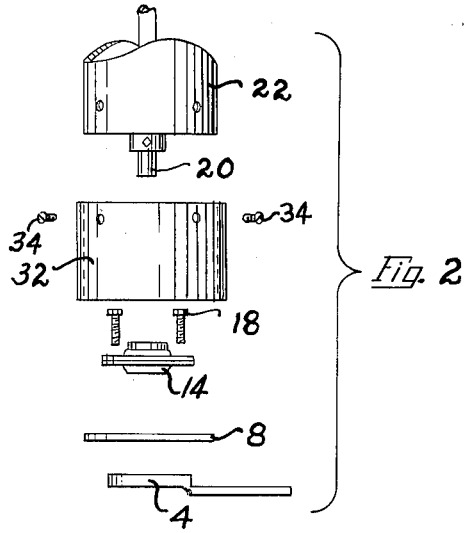
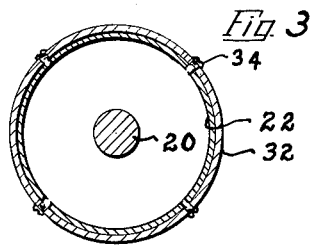
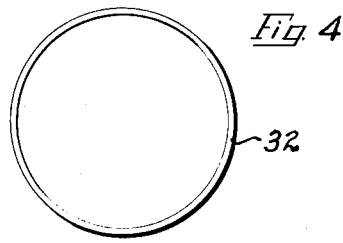
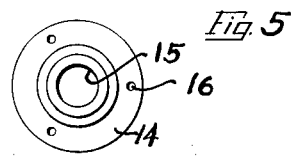
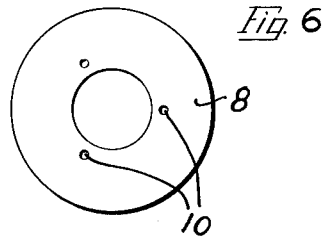
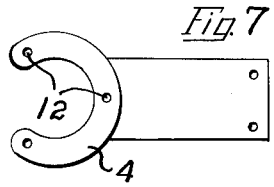
IRVIN D. McEACHERN
INVENTOR.
BY
Wayland D. Keith
HIS AGENT.

Oct. 12, 1965  I. D. McEACHERN  3,210,920
ATTACHMENT FOR CYLINDERS OF COMBINES
Filed June 27, 1963  2 Sheets-Sheet 2
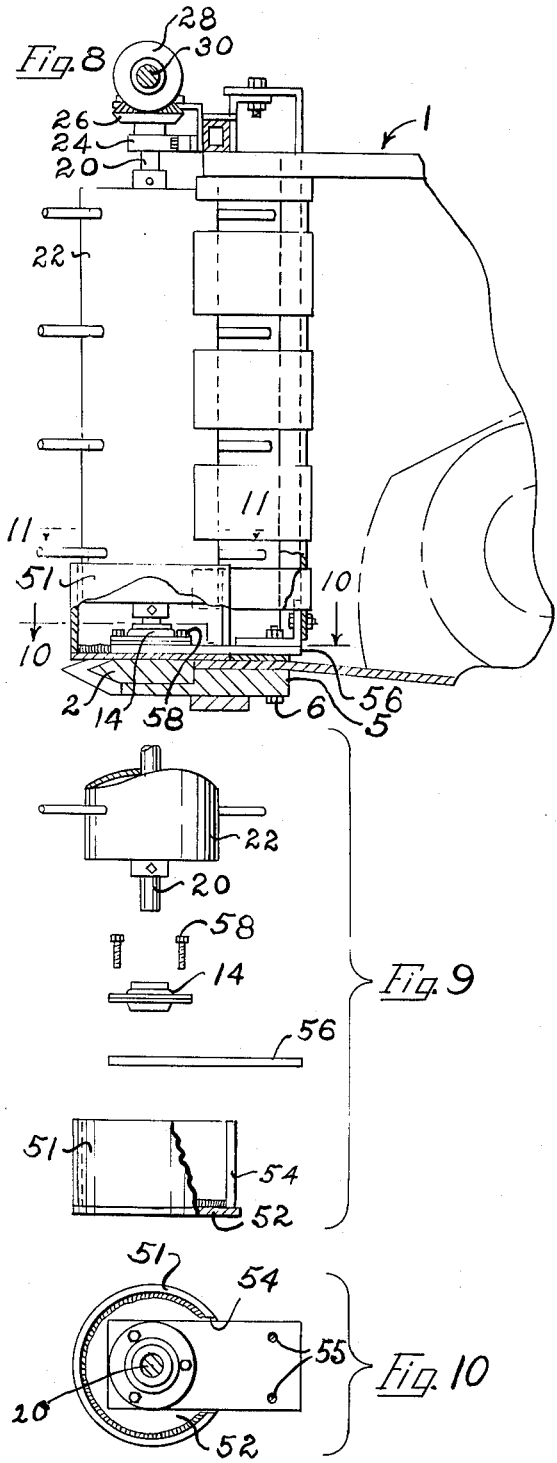
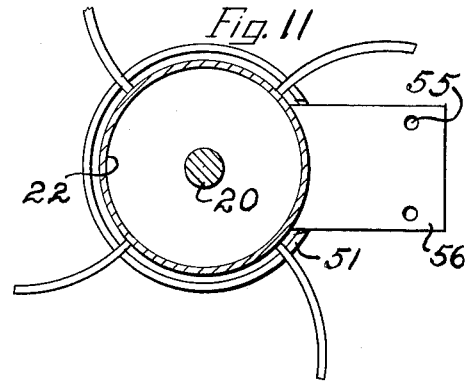
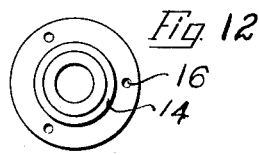
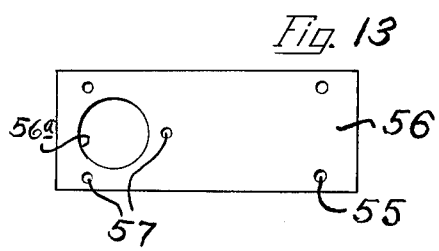
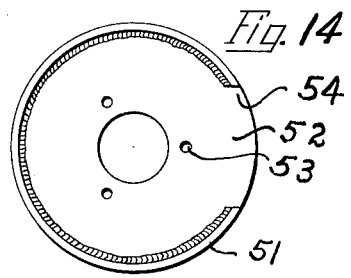
IRVIN D. McEACHERN
INVENTOR.
BY
Wayland D. Keith
HIS AGENT.

United States Patent Office 3,210,920
Patented Oct. 12, 1965

3,210,920
ATTACHMENT FOR CYLINDERS OF COMBINES
Irvin D. McEachern, Hale Center, Tex.; William T. McEachern, executor of said Irvin D. McEachern
Filed June 27, 1963, Ser. No. 291,029
1 Claim. (Cl. 56—119)

This invention relates to improvements in attachments for combines, and more particularly to an attachment for the cylinders of a combine, such as disclosed in my Patent No. 2,929,185, Gathering Attachment for Combines, and in my Patent No. 2,948,100, Grain Gathering Attachment for Combines. The present invention is illustrated as being attached to the device shown in the latter patent, and only the portion of the combine ancillary to the present invention has been shown.

The devices disclosed by the patents mentioned above function in a satisfactory manner for cutting relatively tall stalks of grain, such as milo, cane, Kaffir, and the like. However, in the cutting of peas, soybeans, and other legumes, which grow relatively close to the ground, and which in some instances, have trailing vines which wrap about the shaft intermediate the bearing and the lower end of the cylinder, a new problem is presented. It is to solve this problem that the present device has been designed as an attachment for the lower ends of the cylinders of a combine, to act as a cylinder guard therefor, and which will cause the vines or the like to move at the same peripheral speed inward with the cylinders, instead of being caught in the bearings and entwined around the shaft on which the cylinder is mounted, which would ultimately necessitate the machine being stopped to remove the vines from around the shaft, so the cutting of the legumes can be continued.

An object of this invention is to provide an attachment for use with a cylinder of a combine, which attachment has pairs of upright vertical cylinders to urge the stalks inward into cutting relation with the reciprocating sickle of the combine, and then into the conveyor mechanism thereof.

Another object of the invention is to provide an attachment for use with a cylinder of a combine, which attachment has pairs of upright, vertical cylinders to urge the stalks inward into cutting relation with the reciprocating sickle of the combine and then into the conveyor mechanism thereof so as to prevent vines and the like from becoming entwined around the shaft on which the combine cylinder is mounted.

Still another object of the invention is to provide a guard for the bearing of a combine, which guard has pairs of upright vertical cylinders which urge the stalks inward into cutting relation with the reciprocating sickle of the combine and then into the conveyor mechanism thereof, so as to prevent vines and the like from becoming entwined around the shaft on which the cylinder of the combine is mounted.

A further object of the invention is to provide an attachment for use with a cylinder of a combine, which attachment has pairs of vertical, upright cylinders, which is simple in construction, easy to install and to remove from the combine, and which is relatively inexpensive to manufacture.

With these objects in mind, and others which will become manifest as the description proceeds, reference is to be had to the accompanying drawing, in which like reference characters designate like parts in the several views thereof, in which:

FIG. 1 is a fragmentary, side elevational view of a portion of a combine having upright stalk gathering cylinders thereon, with parts being broken away, and with parts being shown in section to bring out the details of construction, and with other parts being shown in dot-dash outline to show the mechanism of the combine;

FIG. 2 is a fragmentary exploded view of the upright cylindrical member, and showing the cylindrical skirt and the position of the correlated parts with respect thereto;

FIG. 3 is a sectional view taken on the line 3—3 of FIG. 1, looking in the direction indicated by the arrows;

FIG. 4 is a top plan view of a cylindrical skirt, shown apart from the cylinder to which it is to be attached;

FIG. 5 is a top plan view of a bearing member;

FIG. 6 is a top plan view of a plate which closes the lower end of the cylindrical skirt;

FIG. 7 shows a plan view of a bearing support member;

FIG. 8 is a view similar to FIG. 1, but of a modified form of skirt on an upright cylindrical member;

FIG. 9 is an exploded, fragmentary, elevational view of the form of the invention as shown in FIG. 8, with parts being broken away and with parts shown in section to bring out the details of construction;

FIG. 10 is a sectional view taken on the line 10—10 of FIG. 8, looking in the direction indicated by the arrows;

FIG. 11 is a sectional view taken on the line 11—11 of FIG. 8, looking in the direction indicated by the arrows;

FIG. 12 is a view similar to FIG. 5, of a bearing member;

FIG. 13 is a view similar to FIG. 7, but of a modified form of bearing support member; and FIG. 14 is a top plan view of the cylindrical skirt as shown in FIG. 8, which is shown apart from the cylinder.

With more detailed reference to the drawing, the numeral 1 designates generally a combine, which is equipped for cutting row crops, such as maize, Kaffir, sorghum cane, and the like, which are planted in rows, and which are cut by a broadcast combine. Such combines are equipped with upright cylindrical stalk gathering members, as disclosed in the above mentioned patents.

The combine, as illustrated in the accompanying drawings, has a conventional reciprocating sickle 2 on which is mounted bearing support members 4, which are secured thereto by means of bolts 6. A plate 8 is mounted on each bearing support member 4 and each plate 8 has holes 10 therein, which holes 10 are in register with holes 12 formed in the respective bearing support members 4. Each bearing 14 is positioned on the respective plate 8 so the holes 16 in each bearing 14 will be in register with the respective holes 10 and 12 in the respective plates 8 and in the respective bearing support members 4. Screw threaded bolts 18 pass through the respective holes 16 and 10 to threadably engage screw threads in hole 12 to bindingly engage each bearing 14 and each plate 8 to the respective support member 4.

A shaft 20 is secured within each upright cylinder 22, each shaft 20 being fitted within the bore 15 of the respective bearings 14, each of which shafts 20 extends upwardly and is journaled in a bearing 20 on the upper end thereof. A bevel gear 26 is secured to the upper end of each shaft 20 and is in mesh with the respective bevel gears 28, which bevel gears 28 are secured to horizontal drive shaft 30, which shaft 30 is positioned above the upper ends of shafts 20, and is driven in a manner to rotate the cylinders 22 of the combine, as is brought out in the above mentioned patents. FIG. 1 is representative of one cylinder positioned on a single upright shaft, however, two cylinders are utilized for each row being harvested, and four rows are usually harvested by the combine simultaneously.

A sleeve or skirt 32 is secured to the lower end of each cylinder 22 by screw threaded members 34. Each skirt 32 extends downward in close relation with the upper surface of sickle 2. Each plate 8 is disc-like in form and is slightly smaller than the inside diameter of each skirt 32, so as to prevent weeds, vines, and tentacles from wrapping around the shafts 20 intermediate the lower end of the respective cylinders 22 and the respective bearing 14.

Modified form of invention

The modified form of invention, as shown in FIGS. 8 through 14, is to be attached to a combine 1, such as a broadcast combine which is equipped with cylinders 22, as disclosed in the above mentioned patents. The present arrangement enables stalks, which are intertwined with vines, to be readily cut. Such crops as peas, soy beans, and other legumes of vine-like nature fall into this category, and with machines in common use, the vines of such crops will wind around the shafts of the cylinders of the combine, as the crop is being cut.

In the modified form of invention, one attachment for a cylinder of a combine is described, but it is to be understood that an attachment is provided for each cylinder 22 of the combine, as for the above described form of attachment.

In the modified form of the device, each attachment comprises a parti-cylindrical guard 51, which is non-rotatable with respect to the cylinder 22 of the combine. The present parti-cylindrical guard 51 has a bottom plate 52, which plate 52 has holes 53 formed therein and which plate 52 is secured in parti-cylindrical guard 51 as by welding. A portion of parti-cylindrical guard 51 is open on the rear side, as indicated at 54, to receive a bearing support plate 56 which has holes 55 and 57 formed therein. The bearing support plate is secured to the sickle frame 5, of the combine, by means of bolt 6 passing through holes 55. The opposite end of the bearing support plate 56 has a hole 56a formed therein to receive the central portion of the bearing 14. Peripherally spaced holes 57 around the hole in the bearing support plate receive bolts 58 therethrough and through the bottom plate 52 of the parti-cylindrical guard 51.

The parti-cylindrical guard 51 is firmly secured to sickle frame 5 of the combine, and is held a spaced distance outward from the lower cylindrical portion of cylinder 22 of the combine, with the parti-cylindrical guard 51 extending upward around the cylinder 22 on the sides and front thereof, which prevents the vines for legumes and the like from wrapping around the lower end of the rotating shaft 20 on which the respective cylinders 22 are mounted.

One of the parti-cylindrical guards 51 is attached to each of the bearing support plates 56 on the combine, so as to prevent the vines from wrapping around the respective shafts, which would ultimately cause the cylinders to stall and would result in material damage to the machinery.

The present parti-cylindrical guard serves the same purpose as the sleeve or skirt described in the first mentioned form of the invention, however, with the present form of attachment, it is not necessary to drill holes in and tap threads in the cylinders 22 to attach the present form of the device.

Having thus clearly shown and described the invention, what is claimed as new and desired to be secured by Letters Patent is:

An attachment for a shaft mounted, rotatable, upright cylinder of a combine having a sickle thereof, a portion of the shaft between the lower end of the cylinder and the sickle of the combine being exposed; which attachment comprises (a) a cylindrical guard sleeve surrounding the lower end of the respective cylinders and extending from a point above the lower end of the cylinder downwardly to surround the shaft intermediate the bottom of the cylinder and the sickle of the combine, (b) screw means securing said cylindrical guard sleeve to the respective cylinders for rotation therewith, (c) support means mounted on and secured to the sickle of the combine,
 (1) said support means being off-set upwardly above the cutting edge of the sickle, (d) a centrally apertured, disc-shaped plate secured to said support means on the upper side thereof, and (e) a bearing supported on said centrally apertured, disc-shaped plate to journal the lower end of the shaft of the cylinder therein.

References Cited by the Examiner
UNITED STATES PATENTS

| | | | |
|---|---|---|---|
| 2,539,619 | 1/51 | Goodall | 56—25.4 X |
| 2,723,521 | 11/55 | Karlsson | 56—119 |
| 2,800,759 | 7/57 | Emmons | 56—25.4 |
| 2,821,832 | 2/58 | Morkoski | 56—44 |
| 2,836,026 | 5/58 | Gray et al. | 56—119 |
| 2,948,100 | 8/60 | McEachern | 56—119 |

ANTONIO F. GUIDA, *Primary Examiner.*

T. GRAHAM CRAVER, *Examiner.*